US012154215B2

(12) United States Patent
Pankratz et al.

(10) Patent No.: US 12,154,215 B2
(45) Date of Patent: Nov. 26, 2024

(54) DYNAMIC NODE TRAVERSAL ORDER FOR RAY TRACING

(71) Applicants: Advanced Micro Devices, Inc., Santa Clara, CA (US); ATI Technologies ULC, Markham (CA)

(72) Inventors: David William John Pankratz, Markham (CA); Konstantin I. Shkurko, Oviedo, FL (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 106 days.

(21) Appl. No.: 17/956,567

(22) Filed: Sep. 29, 2022

(65) Prior Publication Data

US 2024/0112392 A1 Apr. 4, 2024

(51) Int. Cl.
*G06T 15/06* (2011.01)
*G06T 15/50* (2011.01)

(52) U.S. Cl.
CPC .............. *G06T 15/06* (2013.01); *G06T 15/50* (2013.01)

(58) Field of Classification Search
CPC ... G06T 15/06; G06T 17/005; G06T 2210/21; G06T 15/08; G06T 2210/12; G06T 17/10; G06T 17/05; G06T 15/50; G06F 16/9027; G06F 2212/1021
See application file for complete search history.

(56) References Cited

U.S. PATENT DOCUMENTS

2015/0379756 A1* 12/2015 Shin ................. G06T 15/06
345/426
2017/0249779 A1* 8/2017 Obert ................ G06T 15/80

* cited by examiner

*Primary Examiner* — Hau H Nguyen
(74) *Attorney, Agent, or Firm* — Volpe Koenig (57) ABSTRACT

Devices and methods for node traversal for ray tracing are provided, which comprise casting a first ray in a space comprising objects represented by geometric shapes, traversing, for the first ray, at least one first node of an accelerated hierarchy structure representing an approximate volume of a group of the geometric shapes and a second node representing a volume of one of the geometric shapes, casting a second ray in the space, selecting, for the second ray, a starting node of traversal based on locations of intersection of the first ray and the second ray and an identifier which identifies one or more nodes intersected by the first ray and traversing, for the second ray, the accelerated hierarchy structure beginning at the starting node of traversal.

20 Claims, 6 Drawing Sheets

DYNAMIC NODE TRAVERSAL ORDER FOR RAY TRACING

BACKGROUND

Ray tracing is a type of graphics rendering technique in which simulated rays of light are cast to test for object intersection and pixels are illuminated and colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

Typically, a scene (e.g., objects in a scene) is represented by a large number of geometric shapes (i.e., polygons). For simplified explanation purposes, in examples described herein, the geometric shapes used to represent a scene are described as triangles even though other shapes to the primitives making up the objects in a scene are possible (the use of "triangle" is merely to reflect that this is typically the most common primitive shape and is being used for ease of understanding). Features of the present disclosure can be implemented, however, using any geometric shape to represent objects in a scene.

Ray tracing renders a three dimensional (3D) scene by casting (i.e. shooting) a simulated light ray from a point of origin in a 3D space of a scene and testing whether the ray intersects an object (e.g., a triangle representing a portion of an object) in a scene. Ray tracing can be used to determine the presence of objects and a variety of characteristics of objects in a scene, such as for example, the distance between an intersection and a point of origin (e.g., the distance between an object and the point of origin), the location (in a 3D space) of objects in a scene, the physical characteristics (e.g., size, shape, luminance and color) of objects in a scene, and whether light is being obstructed (e.g., a first object, located between a second object and a light source, casts a shadow on the second object).

Separate rays can be cast on each triangle in a scene to determine the presence and characteristics of objects. However, each ray intersection test is complex and expensive in terms of processing resources. Accordingly, acceleration structures, such as a bounding volume hierarchy (BVH accelerated structure) are used to implement ray tracing more efficiently to make accurate determinations.

For example, as described in further detail herein, in a BVH accelerated structure, numbers of triangles are grouped together (e.g., by a bounding box) and multiple hierarchies (i.e., hierarchy levels) of triangles (or groups of triangles) are created. The bounding volume hierarchy data structure allows the number of ray-triangle intersections to be reduced as compared with a scenario in which no such data structure was used and therefore all triangles in a scene would have to be tested against the ray. Specifically, if a ray does not intersect a particular bounding box, and that bounding box bounds a large number of triangles, then each triangle in that box can be eliminated from the test. Thus, a ray intersection test is performed as a sequence of tests of the ray against axis-aligned bounding boxes, followed by tests against triangles.

In a simplified example, if 4 triangles are grouped together for testing, a hierarchy tree can be created which includes 3 separate hierarchical levels. In this example, the first level includes the group of 4 triangles. The second level includes 2 separate groups of 2 triangles branched off of the group of 4 triangles, with 1 group represented by 2 of the 4 triangles and the other group represented by the 2 other triangles. The third level includes the 4 individual triangles, with the first and second triangles branching off of the first group of triangles in the second level and the third and fourth triangles branching off of the second group of triangles in the second level. According to conventional ray tracing testing, ray is first tested (e.g., cast) between a point of origin (e.g., in a 3D space) and the group of 4 triangles (i.e., the first level). When there is no hit (i.e., no object detected), then no further ray tracing is performed on the group of 4 triangles by intersecting the bounding box of those 4 triangles. When there is a hit (i.e., an object is detected), the testing proceeds to the second level. The first group in the second level is then tested. If there is a hit on the first group in the second level, traversal continues to the third level and the process repeats. When a hit occurs on one of the nodes (e.g., a triangle) in the third level, then traversal is either aborted or continues to other nodes in which an object is detected. For example, traversal is aborted when an occluded mode is used. Alternatively, traversal continues to other nodes in which an object is detected (e.g., if a ray hits both the first and second group) when a closest hit mode is used.

Accordingly, a determination of which triangles (representing an object) are "hit" by a cast ray can be made without testing all the triangles the second group of triangles in the second level or the third and fourth triangles in the third level. For example, in the above, a determination of the triangles hit by a cast ray is made using 4 tests (i.e., 2 ray/box tests and 2 ray/triangle tests) for 4 triangles. However, as can be appreciated, when a larger group of triangles is tested using a bounding volume hierarchy, many more groups of triangles may be eliminated from testing. Accordingly, as the number of triangles in a testing region increases, a bounding volume hierarchy typically reduces the total number of tests to be performed for the region (e.g., 10 tests for 1000 triangles) and ray tracing is implemented more efficiently while maintaining accuracy.

The overall performance of ray tracing depends on the number of ray intersection tests (e.g., intersection of triangles and acceleration structure nodes). The order in which acceleration structure nodes are visited during ray traversal has a high degree of similarity in both space (e.g., between neighboring rays within the same ray dispatch or the same frame) and time (e.g., between subsequent ray dispatches or subsequent rendered frames).

Some conventional ray tracing techniques exploit the spatial locality of rays during traversal by batching rays into "ray packets," where each packet contains a number of rays traced together. During traversal, all rays in the packet are traversed together from the root of the tree, intersecting the same nodes. Accordingly, if one ray in the packet intersects a node, all rays continue traversing the sub-nodes (e.g., child nodes) of the intersected node. However, although these techniques increase the reuse of data (e.g., cached data), these techniques typically increase the average number of intersection tests per ray. In addition, these conventional ray tracing techniques do not exploit the coherence between the similarity in both space and time.

In contrast to conventional ray tracing techniques (e.g., techniques which use ray packets), features of the present disclosure provide a more efficient ray tracing procedure by using both temporal and spatial data to reorder the order of node traversal. The temporal and spatial similarity is exploited by subsequent ray traversals to facilitate a significant reduction in the number of acceleration structure nodes traversed by a ray (which reduces the average number of intersection tests per ray), thereby improving the overall ray tracing performance.

Features of the present disclosure include identifiers (e.g., hit tokens) which identifies nodes, bounding the volume of the geometry, that are intersected by a ray. Instead of beginning traversal at the highest node intersected by each ray and then traversing sub-nodes (i.e., child nodes) of the highest node intersected by each ray (as performed by conventional traversal algorithms), the identifiers are used (e.g., shared) by subsequent rays to select, as starting nodes for traversal, sub-nodes of the nodes that are identified as intersecting the previously casted ray. When the location of intersection of a subsequent ray is within a threshold of the location of intersection of the first ray (e.g., similar intersection locations of a frame (i.e., spatial similarity) or similar intersection locations of different frames (i.e., temporal similarity)), the starting node is selected based on the identifier and traversal of the accelerated hierarchy structure for the second ray begins at the starting node. Accordingly, because the number of nodes traversed by subsequent rays are reduced, the amount of memory and time used to store the data for additional nodes is avoided, improving overall performance.

The location threshold is, for example, a distance in the space between the locations of intersection, a number of pixels between the locations of intersection of the first ray and the second ray, or a number of dimensional coordinates (e.g., 3D coordinates).

In addition, features of the present disclosure facilitate the skipping of node traversal for rays which intersect a node but are close to the ray origin (e.g., shadow rays or ambient occlusion rays), further improving ray tracing performance. The adaptive traversal is also complementary to secondary acceleration structures for discovering ray misses.

A method of node traversal for ray tracing is provided which comprises casting a first ray in a space comprising objects represented by geometric shapes, traversing, for the first ray, at least one first node of an accelerated hierarchy structure representing an approximate volume of a group of the geometric shapes and a second node representing a volume of one of the geometric shapes, casting a second ray in the space, selecting, for the second ray, a starting node of traversal based on locations of intersection of the first ray and the second ray and an identifier which identifies one or more nodes intersected by the first ray and traversing, for the second ray, the accelerated hierarchy structure beginning at the starting node.

A processing device used for ray tracing is provided which comprises memory and a processor. The processor is configured to cast a first ray in a space comprising objects represented by geometric shapes, traverse, for the first ray, at least one first node of an accelerated hierarchy structure representing an approximate volume of a group of the geometric shapes and a second node representing a volume of one of the geometric shapes, cast a second ray in the space, select, for the second ray, a starting node of traversal based on locations of intersection of the first ray and the second ray and an identifier which identifies one or more nodes intersected by the first ray and traverse, for the second ray, the accelerated hierarchy structure beginning at the starting node.

A non-transitory computer readable medium is provided which comprises instructions for causing a computer to execute a method of node traversal for ray tracing. The instructions comprise casting a first ray in a space comprising objects represented by geometric shapes, traversing, for the first ray, at least one first node of an accelerated hierarchy structure representing an approximate volume of a group of the geometric shapes and a second node representing a volume of one of the geometric shapes, casting a second ray in the space, selecting, for the second ray, a starting node of traversal based on locations of intersection of the first ray and the second ray and an identifier which identifies one or more nodes intersected by the first ray and traversing, for the second ray, the accelerated hierarchy structure beginning at the starting node.

Figure 1:
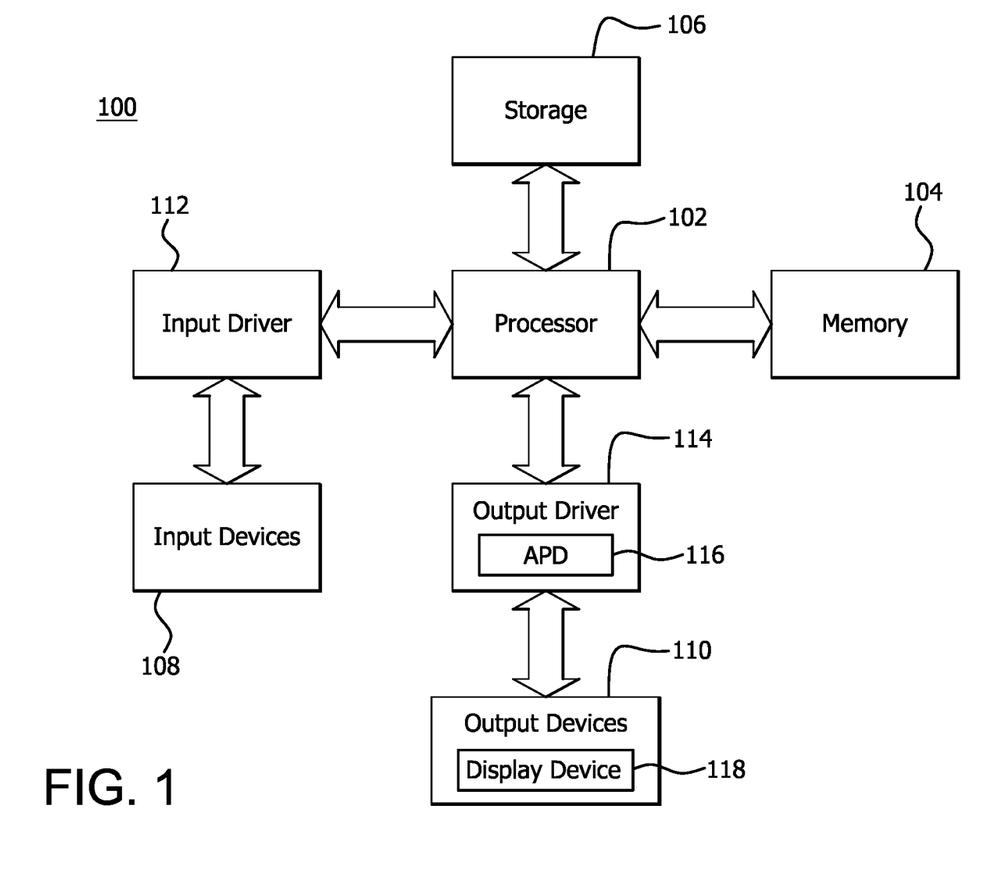
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a display connector/interface (e.g., an HDMI or DisplayPort connector or interface for connecting to an HDMI or DisplayPort compliant device), a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
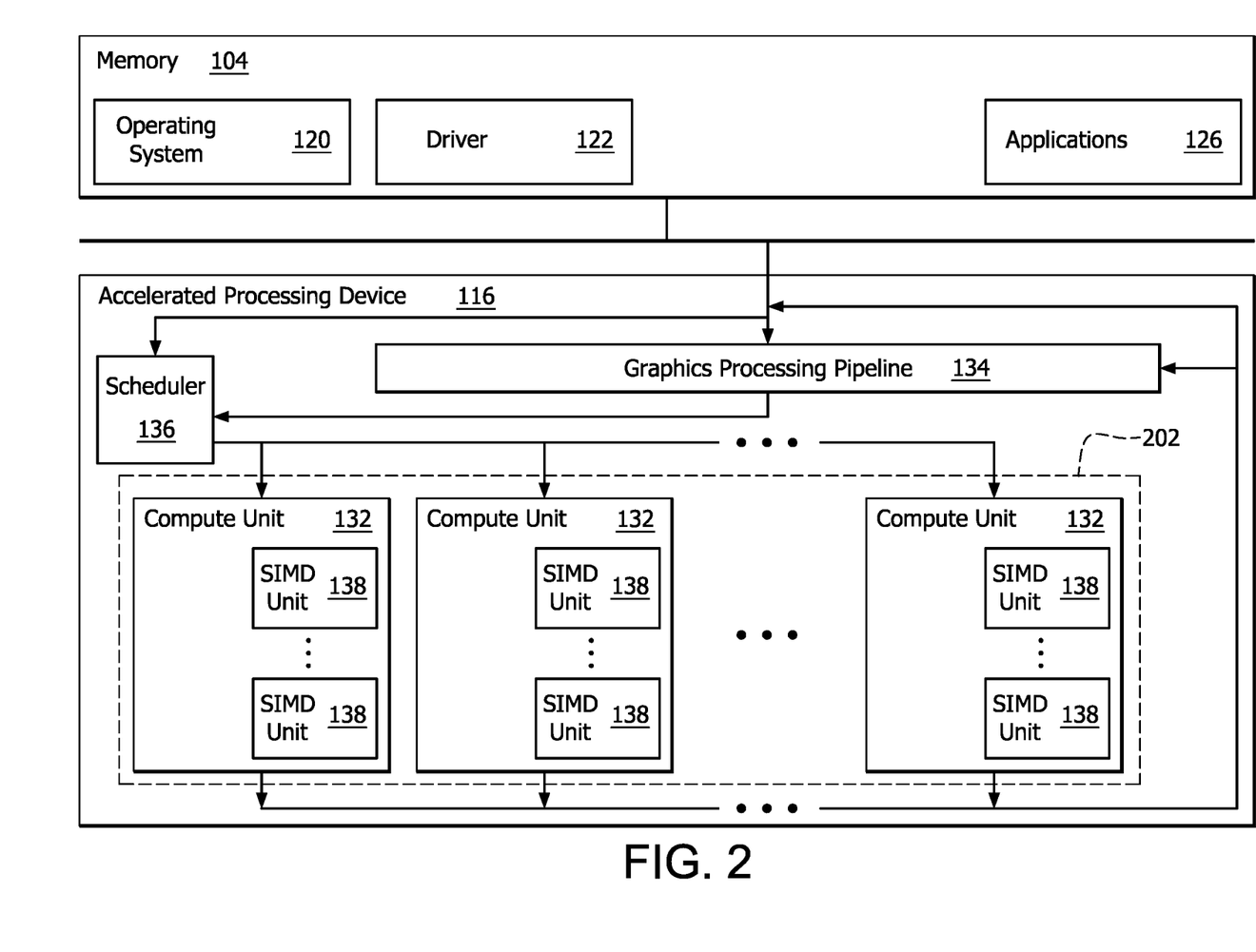
FIG. 2 is a block diagram of the device, illustrating additional details related to execution of processing tasks on the accelerated processing device of FIG. 1, according to an example.

FIG. 2 is a block diagram of aspects of device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (collectively "compute units 202") that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" (also "waves") on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations and non-graphics operations (sometimes known as "compute" operations). Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
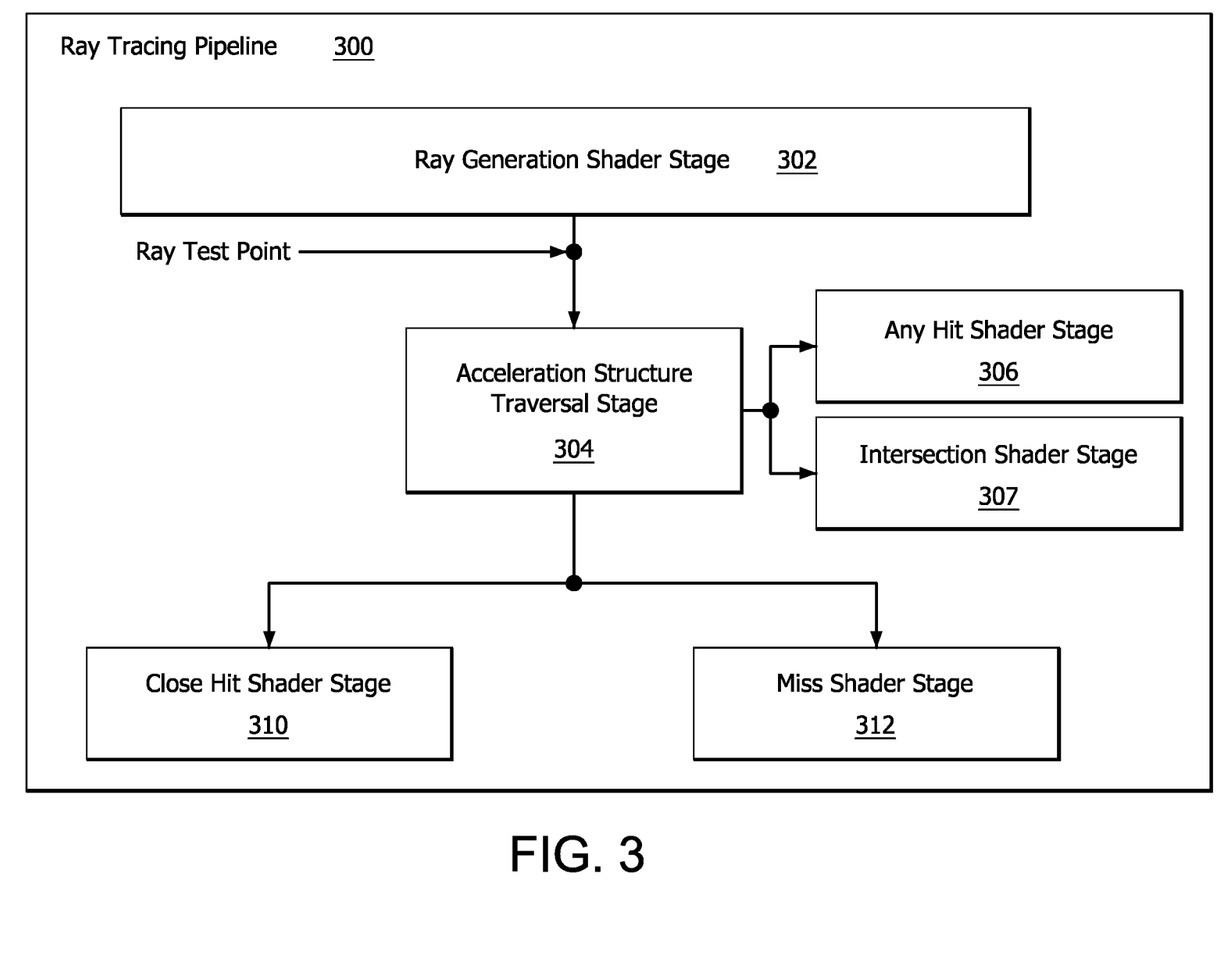
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are shader-implemented stages that represent ray tracing pipeline stages whose functionality is performed by shader programs executing on the SIMD unit 138. Any of the specific shader programs at each particular shader-implemented stage are defined by application-provided code (i.e., by code provided by an application developer that may pre-compiled by an application compiler and/or compiled by the driver 122). The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage may be implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a task]" is used, this means that the hardware and/or software that implements the ray tracing pipeline 300 does that task.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects within the scene, and tests the ray against triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 may "reject" a hit is when at least a portion of a triangle that the acceleration structure traversal stage 304 reports as being hit is fully transparent. Because the acceleration structure traversal stage 304 only tests geometry, and not transparency, the any hit shader 306 that is invoked due to an intersection with a triangle having at least some transparency may determine that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that the shader programs defined for the closest hit shader 310 and miss shader 312 may implement a wide variety of techniques for coloring ray and/or performing other operations.

A typical way in which ray generation shaders 302 generate rays is with a technique referred to as backwards ray tracing. In backwards ray tracing, the ray generation shader 302 generates a ray having an origin at the point of the camera (i.e., the eye of the viewer). The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray intersects an object is referred to herein as a "ray intersection test." The ray intersection test involves shooting a ray from an origin and determining whether the ray intersects a triangle and, if so, what distance from the origin the triangle intersection is at. For efficiency, the ray tracing test uses a representation of space referred to as a bounding volume hierarchy. This bounding volume hierarchy is the "acceleration structure" referred to elsewhere herein. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle or other geometry against which a ray intersection test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
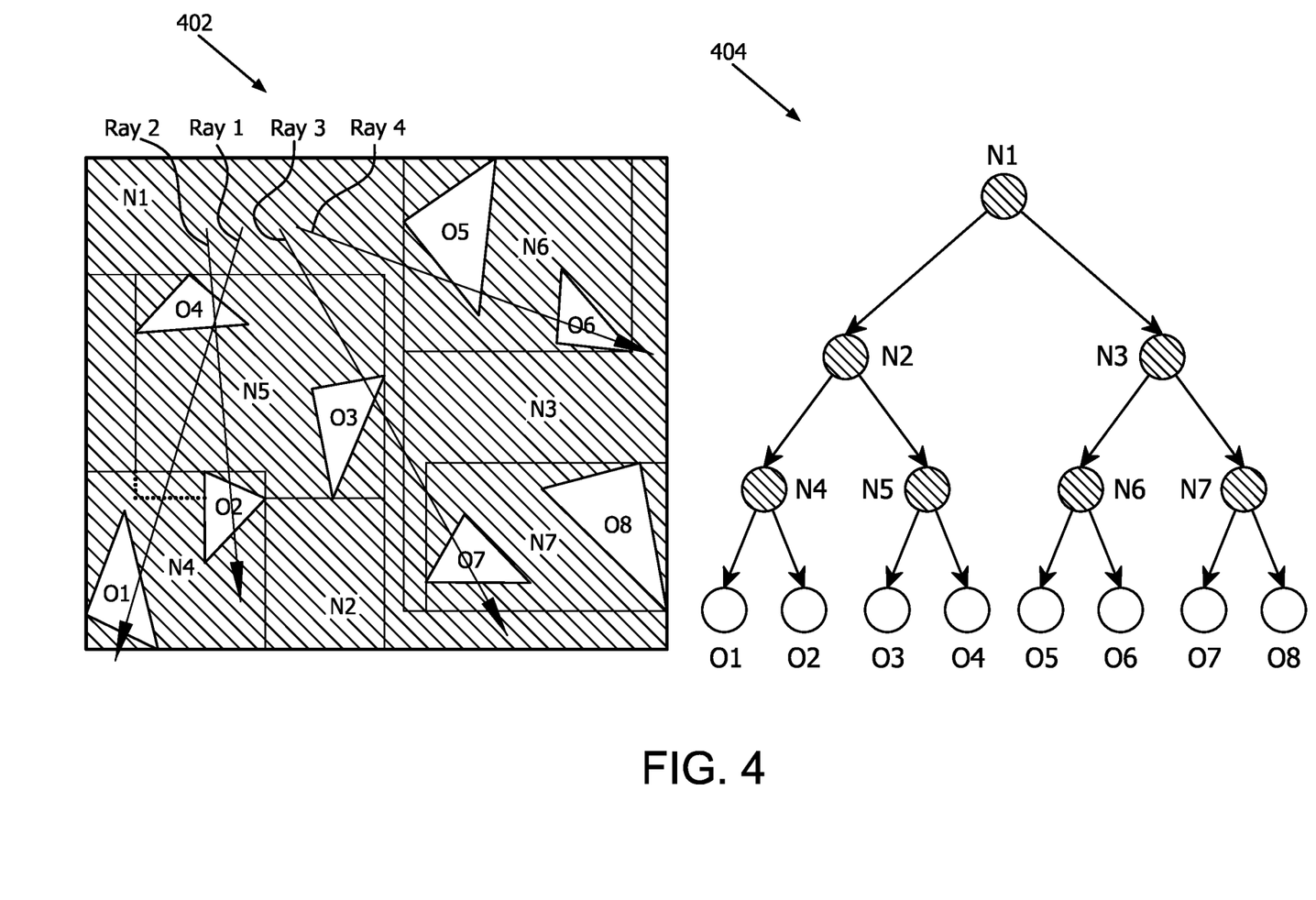
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the BVH is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404.

A conventional ray intersection test would be performed by traversing through the tree 404, and, for each non-leaf node tested, eliminating branches below that node if the test for that non-leaf node fails. In an example of a conventional ray intersection test, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

The ray tracing pipeline 300 casts rays to detect whether the rays hit triangles and how such hits should be shaded. Each triangle is assigned a material, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader or an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, the ray tracing pipeline 300 traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of the ray tracing pipeline 300 is now discussed with respect to the example rays 1-4 illustrated in FIG. 4. For each of the example rays 1-4, the ray tracing pipeline 300 determines which triangles those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

An example of conventional traversal the acceleration structure 304,example, for ray 1, the ray racing pipeline 300 runs the closest hit shader for $O_4$ unless that triangle had an any hit shader or intersection shader that, when executed, indicated that ray 1 did not hit that triangle. In that situation, the ray tracing pipeline 300 would run the closest hit shader for $O_1$ unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with $O_2$ and $O_4$, executes an any hit and/or an intersection shader for those triangles if specified by the material, and runs the appropriate closest hit or miss shader. For rays 3 and 4, the ray tracing pipeline 300 determines intersections as shown (ray 3 intersects $O_3$ and $O_7$ and ray 4 intersects $O_5$ and $O_6$), executes appropriate any hit and an/or intersection shaders, and executes appropriate closest hit or miss shaders based on the results of the any hit and/or intersection shaders.

As described above, in contrast to conventional ray tracing techniques (e.g., techniques which use ray packets), features of the present disclosure provide a more efficient ray tracing procedure by using both temporal and spatial data to reorder the order of node traversal. The temporal and spatial similarity is exploited by subsequent ray traversals to facilitate a significant reduction in the number of acceleration structure nodes traversed by a ray (which reduces the average number of intersection tests per ray), thereby improving the overall ray tracing performance.

Figure 5:
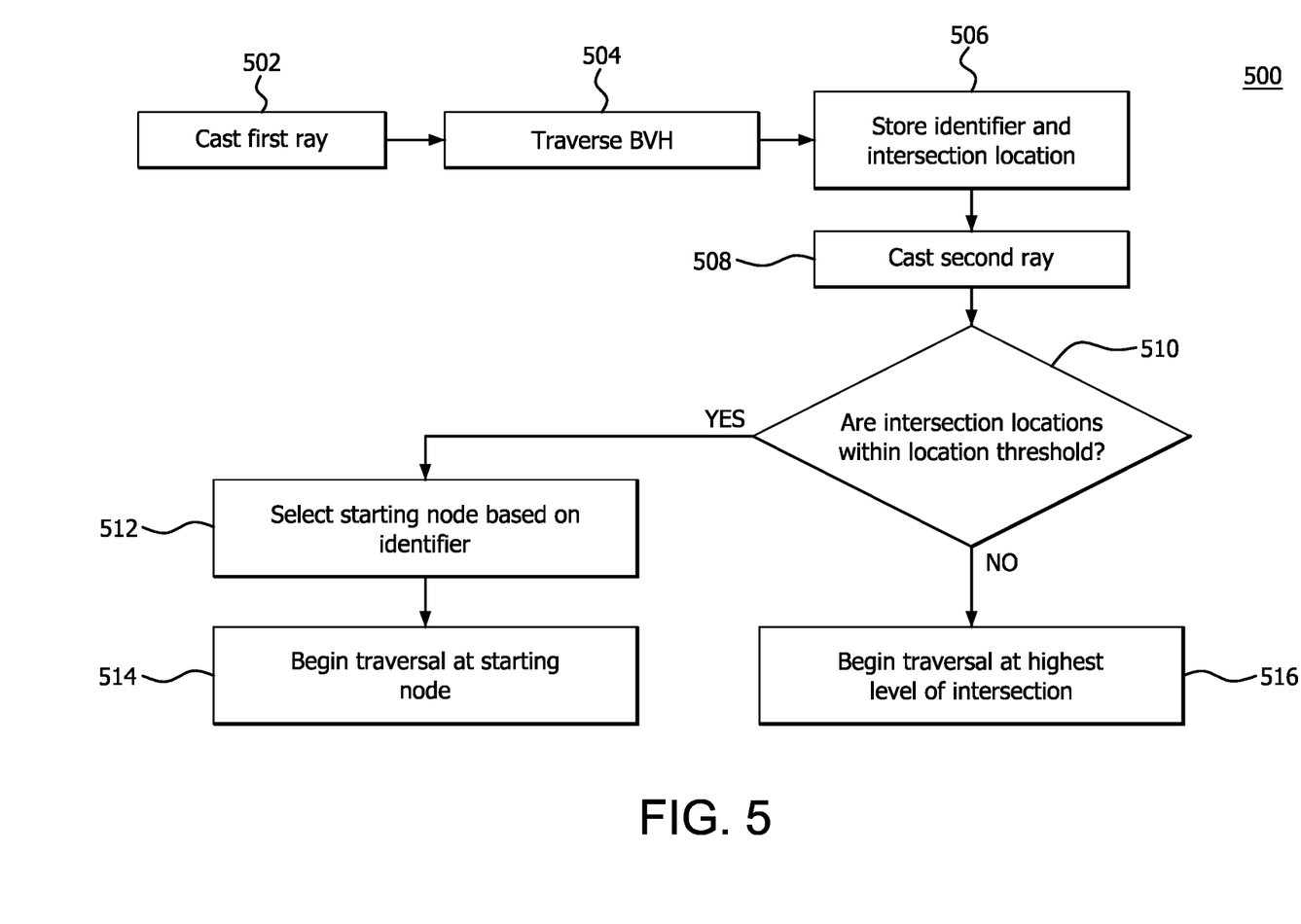
FIG. 5 is a flow diagram illustrating an example method of node traversal for ray tracing according to features of the present disclosure.

FIG. 5 is a flow diagram illustrating an example method 500 of node traversal for ray tracing according to features of the present disclosure. The example method 500 is described using the spatial representation 600 and the BVH tree representation 602 shown in FIG. 6.

Figure 6:
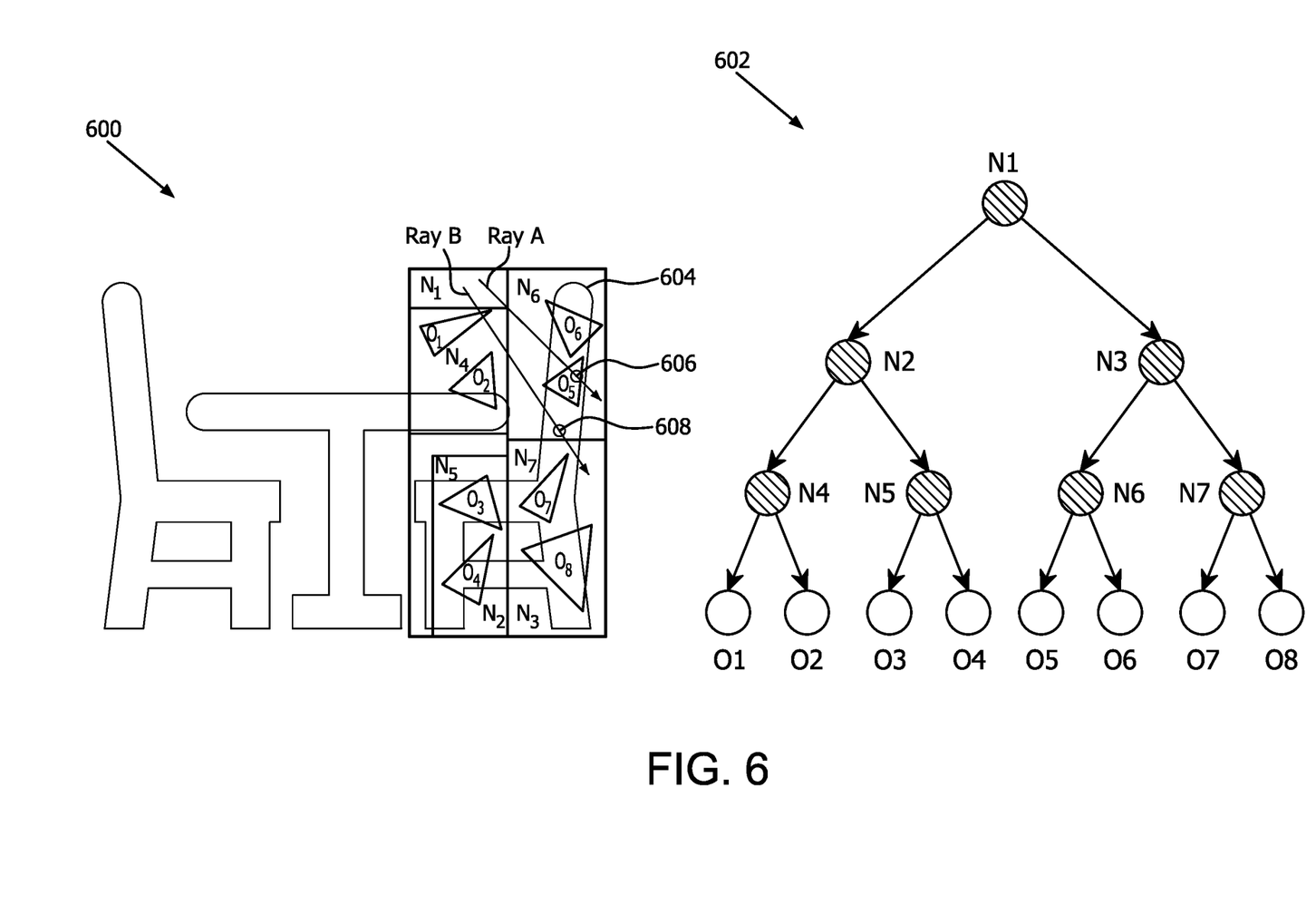
FIG. 6 is an illustration of a bounding volume hierarchy, which includes two rays intersecting an object at different locations in a space, according to an example.

FIG. 6 is an illustration of a BVH, which includes two rays (Ray A and Ray B) intersecting an object (chair 604) at different locations 606 and 608 in a space, according to an example. The spatial representation 600 (hereinafter "space") of the BVH is illustrated in the left side of FIG. 6 and the tree representation 602 of the BVH is illustrated in the right side of FIG. 6. The non-leaf nodes are represented with the letter "N" and the leaf nodes are represented with the letter "O" in both the space 600 and the tree representation 602.

The space 600 includes a plurality of objects (e.g., two chairs and a table) which are, for example, included in a frame to be processed. The objects shown in FIG. 6 are merely an example. Features of the present disclosure can be implemented using any number and types of objects. The number, location and sizes of the triangles shown in FIG. 6 are merely an example. Features of the present disclosure can be implemented using any number, location and sizes of different shapes (e.g., polygons). In addition, the number of rays cast in the space 600 are merely an example. Features of the present disclosure can be implemented using more than the two rays cast in FIG. 6.

For simplification purposes, bounding boxes (i.e., nodes N) are shown for the chair 604 on the right side of the space 602. Bounding boxes are not shown for the other portions of the space 602. Features of the present disclosure can, however, be implemented for any number of bouncing boxes (i.e., nodes N).

The outside bounding box (i.e., box surrounding the chair 604) corresponds to Node $N_1$ and includes triangles $O_1$-$O_8$. The left side (left of the middle vertical center line) of the outside bounding box corresponds to Node $N_2$ and includes triangles $O_1$-$O_4$. The right side (right of the middle vertical center line) of the outside bounding box corresponds to Node $N_3$ and includes triangles $O_6$-$O_8$. Node $N_4$ includes triangles $O_1$ and $O_2$. Node $N_5$ includes triangles $O_3$ and $O_4$. Node $N_6$ includes triangles $O_5$ and $O_6$. Node $N_7$ includes triangles $O_7$ and $O_8$.

As shown at block 502, the method 500 includes casting a first ray in a space comprising objects represented by geometric shapes. For example, FIG. 6 illustrates a first ray (Ray A) intersecting a chair 604 at intersection location 606 in space 600 and a second ray (Ray B) intersecting the chair 604 at intersection location 608 in space 600.

As shown at block 504, the method 500 includes traversing the BVH tree for the first ray according to conventional traversal. For example, if the first ray intersects $O_5$ but no other triangle (as shown in FIG. 6), traversal for the first ray would include beginning traversal at the highest node $N_1$ and would first test against $N_1$, determining that that test succeeds (hit). The test would then test against $N_2$, determining that the test fails (miss, since $O_5$ is not within $N_1$). The test would eliminate all sub-nodes of $N_2$ and would test against $N_3$, noting that that test succeeds (hit). The test would test $N_6$ and $N_7$, noting that $N_6$ succeeds (hit) but $N_7$ fails. The test would test $O_5$ and $O_6$, noting that $O_5$ succeeds (hit) but $O_6$ fails (miss).

As shown at block 506, the method 500 includes storing an identifier (e.g., hit token) and the intersection location 606 by the first ray. For example, identifiers, which identify non-leaf nodes $N_1$, $N_2$ and $N_4$ as intersected by the first ray, are stored.

As shown at block 508, the method 500 includes casting a second ray in the space. For example, the second ray (Ray B) is cast which intersects the chair 604 at intersection location 608 in the space 600.

As shown at decision block 510, the method 500 includes determining whether intersection locations 606 and 608 of the first ray (Ray A) and the second ray (Ray B) are within a location threshold.

The intersection locations 606 and 608 are compared to each other and a determination is made, at decision block 510, whether or not intersection locations 606 and 608 are within a threshold location of each other. The location threshold is, for example, a distance in the space between the locations of intersection, a number of pixels between the locations of intersection of the first ray and the second ray, or a number of dimensional coordinates (e.g., 3D coordinates) of the space 600.

When a determination is made, at decision block 510, that intersection locations 606 and 608 are within a threshold location of each other (e.g., equal to or less than a threshold distance, a threshold number of pixels or a threshold number of dimensional coordinates (e.g., 3D coordinates or 2D coordinates), the method proceeds to block 512 and the starting node for traversal of the BVH tree for the second ray (Ray B) is selected based on the identifier. That is, instead of starting the traversal for the second ray at Node $N_1$, a sub-node of Node $N_1$ is selected as the starting node. For example, Node $N_3$ (or alternatively Node $N_6$) is selected as the starting node for traversal of the BVH tree for the second ray.

The example shown in FIG. 6B illustrates a spatial similarity of the intersection locations 606 and 608 in space 600 of the same frame. Alternatively, intersection locations can also have a temporal similarity. For example, if a first ray includes a location intersection in a first frame that is within a location threshold of a location intersection of a second ray in a subsequent frame (e.g., second frame), the two location intersections have both a spatial and temporal similarity. That is, the intersection location of a first ray in a first frame (or the corresponding location in the second frame) is compared to the intersection location of a second ray in the second frame to make the determination at decision block 510.

As shown at block 514, the method 500 includes traversing, for the second ray, the accelerated hierarchy structure beginning at the starting node identified by the identifier (e.g., hit token). For example, traversal of the BVH tree for the second ray begins at Node $N_3$ (or alternatively Node $N_6$) before proceeding to sub-nodes $N_6$, $O_5$ and $O_6$. Accordingly, the number of acceleration structure nodes traversed for the second ray is reduced, thereby reducing the amount of memory used to store data and improving the performance.

When a determination is made, at decision block 510, that intersection locations 606 and 608 are not within a threshold location of each other, the method proceeds to block 516 and traversal begins at the highest level node of intersection (highest level of intersection) by the second ray (e.g., Node $N_1$ in the example above).

The example method 500 in FIG. 5 illustrates an example of using identifiers (e.g., hit tokens) which identifies nodes, bounding the volume of the geometry, that are intersected by a ray. That is, instead of beginning traversal at the highest node intersected by each ray and then traversing sub-nodes (i.e., child nodes) of the highest node intersected by each ray (as performed by conventional traversal algorithms), the identifiers are used (e.g., shared) by subsequent rays to select, as starting nodes for traversal, sub-nodes of the nodes that are identified as intersecting the previously casted ray. Accordingly, because the number of nodes traversed by subsequent rays are reduced, the amount of memory and time used to store the data for additional nodes is avoided, improving overall performance.

Selection of the starting node can also be based on a number of consecutive hits (e.g., 5). For example, if a particular sub-node is identified as being intersected by 5 subsequent rays (e.g., over the same frame or 5 different frames), a lower sub-node can be selected as the starting node. That is, using the example above, if Node $N_3$ is identified as being intersected by a number of subsequent rays, Node $N_6$ can be selected as the starting node for the next ray.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of node traversal for ray tracing, the method comprising:
   casting a first ray in a space comprising objects represented by geometric shapes;
   traversing, for the first ray, at least one first node of an accelerated hierarchy structure representing an approximate volume of a group of the geometric shapes and a second node representing a volume of one of the geometric shapes;
   casting a second ray in the space;
   comparing a location of intersection of the first ray and a location of intersection of the second ray;
   in response to a location of intersection of the second ray being within a location threshold of a location of intersection of the first ray, selecting, for the second ray, a starting node of traversal based on one or more nodes intersected by the first ray; and
   traversing, for the second ray, the accelerated hierarchy structure beginning at the starting node of traversal.

2. The method of claim 1, wherein the at least one first node is a non-leaf node of a bounding volume hierarchy (BVH) structure and the second node is a leaf node of the BVH structure.

3. The method of claim 1, wherein the locations of intersection of the first ray and the second ray are locations in a same frame.

4. The method of claim 1, wherein the locations of intersection of the first ray and the second ray are locations in different frames.

5. The method of claim 1, wherein the location threshold is a distance in the space between the locations of intersection of the first ray and the second ray.

6. The method of claim 1, wherein the location threshold is a number of pixels between the locations of intersection of the first ray and the second ray.

7. The method of claim 1 wherein the location threshold is a number of dimensional coordinates between the locations of intersection of the first ray and the second ray.

8. A processing device used for ray tracing, the processing device comprising:
   memory; and
   a processor configured to:
   cast a first ray in a space comprising objects represented by geometric shapes;
   traverse, for the first ray, at least one first node of an accelerated hierarchy structure representing an approximate volume of a group of the geometric shapes and a second node representing a volume of one of the geometric shapes;
   cast a second ray in the space;
   compare a location of intersection of the first ray and a location of intersection of the second ray;
   in response to a location of intersection of the second ray being within a location threshold of a location of intersection of the first ray, select, for the second ray, a starting node of traversal based on one or more nodes intersected by the first ray; and
   traverse, for the second ray, the accelerated hierarchy structure beginning at the starting node of traversal.

9. The processing device of claim 8, wherein the at least one first node is a non-leaf node of a bounding volume hierarchy (BVH) structure and the second node is a leaf node of the BVH structure.

10. The processing device of claim 8, wherein the locations of intersection of the first ray and the second ray are locations in a same frame.

11. The processing device of claim 8, wherein the locations of intersection of the first ray and the second ray are locations in different frames.

12. The processing device of claim 8, wherein the location threshold is a distance in the space between the locations of intersection of the first ray and the second ray.

13. The processing device of claim 8, wherein the location threshold is a number of pixels between the locations of intersection of the first ray and the second ray.

14. The processing device of claim 8, wherein the location threshold is a number of dimensional coordinates between the locations of intersection of the first ray and the second ray.

15. The processing device of claim 8, further comprising a display device, and
   wherein the ray tracing is performed for a plurality of images displayed on the display device.

16. A non-transitory computer readable medium comprising instructions for causing a computer to execute a method of node traversal for ray tracing, the instructions comprising:
   casting a first ray in a space comprising objects represented by geometric shapes;
   traversing, for the first ray, at least one first node of an accelerated hierarchy structure representing an approximate volume of a group of the geometric shapes and a second node representing a volume of one of the geometric shapes;

casting a second ray in the space;

comparing a location of intersection of the first ray and a location of intersection of the second ray;

in response to a location of intersection of the second ray being within a location threshold of a location of intersection of the first ray, selecting, for the second ray, a starting node of traversal based on one or more nodes intersected by the first ray; and traversing, for the second ray, the accelerated hierarchy structure beginning at the starting node of traversal.

17. The non-transitory computer-readable medium of claim 16, wherein the at least one first node is a non-leaf node of a bounding volume hierarchy (BVH) structure and the second node is a leaf node of the BVH structure.

18. The non-transitory computer-readable medium of claim 16, wherein the locations of intersection of the first ray and the second ray are locations in a same frame.

19. The non-transitory computer-readable medium of claim 16, wherein the locations of intersection of the first ray and the second ray are locations in different frames.

20. The non-transitory computer-readable medium of claim 16, wherein the location threshold is a distance in the space between the locations of intersection of the first ray and the second ray.

\* \* \* \* \*